United States Patent [19]

Gove et al.

[11] Patent Number: 5,488,431
[45] Date of Patent: Jan. 30, 1996

[54] VIDEO DATA FORMATTER FOR A MULTI-CHANNEL DIGITAL TELEVISION SYSTEM WITHOUT OVERLAP

[75] Inventors: Robert J. Gove, Plano; Donald B. Doherty, Richardson; Scott D. Heimbuch; Paul M. Urbanus, both of Dallas; Stephen W. Marshall, Richardson, all of Tex.

[73] Assignee: Texas Instruments Incorporated, Dallas, Tex.

[21] Appl. No.: 407,788

[22] Filed: Mar. 20, 1995

Related U.S. Application Data

[63] Continuation of Ser. No. 148,768, Nov. 4, 1993, abandoned.

[51] Int. Cl.$^6$ .................................................. H04N 9/64
[52] U.S. Cl. ................................... 348/716; 348/721
[58] Field of Search .................................. 348/714–721; H04N 9/64

[56] References Cited

U.S. PATENT DOCUMENTS

| | | | |
|---|---|---|---|
| 4,942,470 | 7/1990 | Nishitani et al. | 348/721 |
| 4,980,765 | 12/1990 | Kudo et al. | 348/716 |
| 5,153,726 | 10/1992 | Billing | 348/716 X |

*Primary Examiner*—Victor R. Kostak
*Attorney, Agent, or Firm*—Julie L. Reed; Richard L. Donaldson; Rene E. Grossman

[57] ABSTRACT

A digital television system (10) System (10) may receive a video signal at composite video interface and separation circuit (16). The video signal is separated into component form by composite video interface and separation circuit (16). The component video signals are converted to digital component video signals in analog to digital converter circuit (18). Line slicer (14) divides each line of digital component video signal into a plurality of channels such that each channel may be processed in parallel by channel signal processors (22a) through (22d). Each channel signal processor (22a) through (22d) may provide two lines of output for each line of video input. The processed digital component video signals may be formatted for displays (26a) through (26c) in formatters (24a) through (24c). Each formatter (24a) through (24c) may comprise a plurality of first in-first out buffer memories (34a) through (34j). One of each channel signal processors (22a) through (22d) may be coupled to two of first in-first out buffer memories (34a) through (34j). Additionally, each formatter (24a) through (24c) may comprise channel data format units (38a) through (38d), each associated with a channel of, for example, display (24a). Channel data format units (38a) through (38d) are coupled to appropriate of first in-first out buffer memories (34a) through (34j) via multiplexers (36a) through (36d). Each formatter (24a) through (24c) may remove overlap between channels of system (10) and may format the processed video signal into appropriate channels for displays (26a) through (26c).

21 Claims, 8 Drawing Sheets

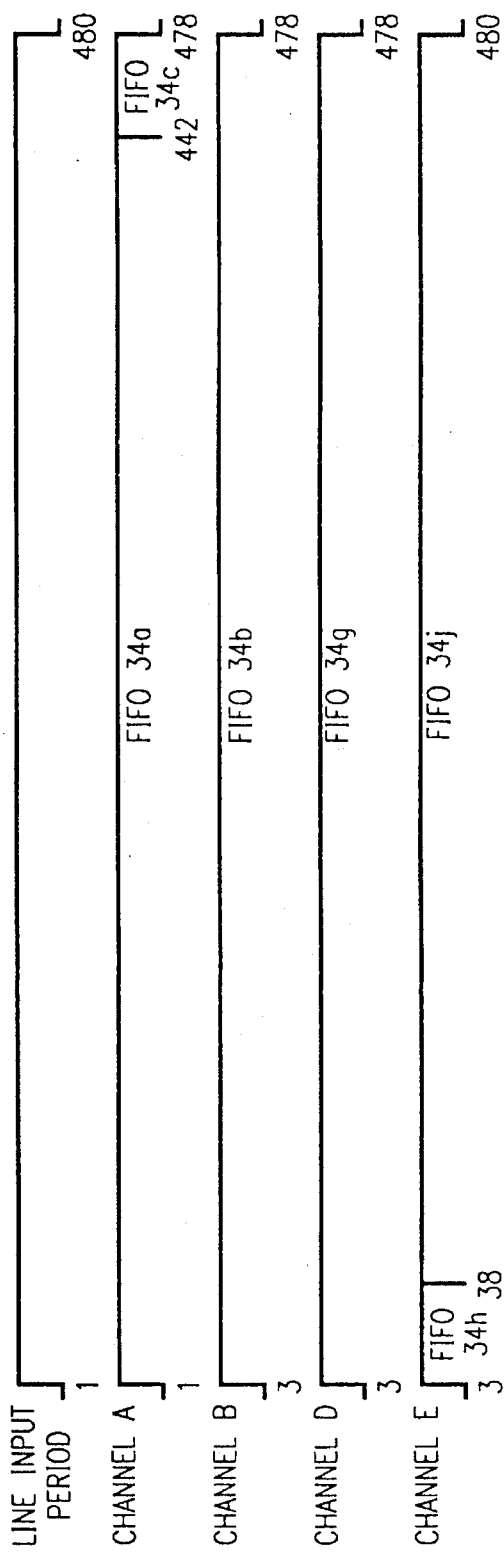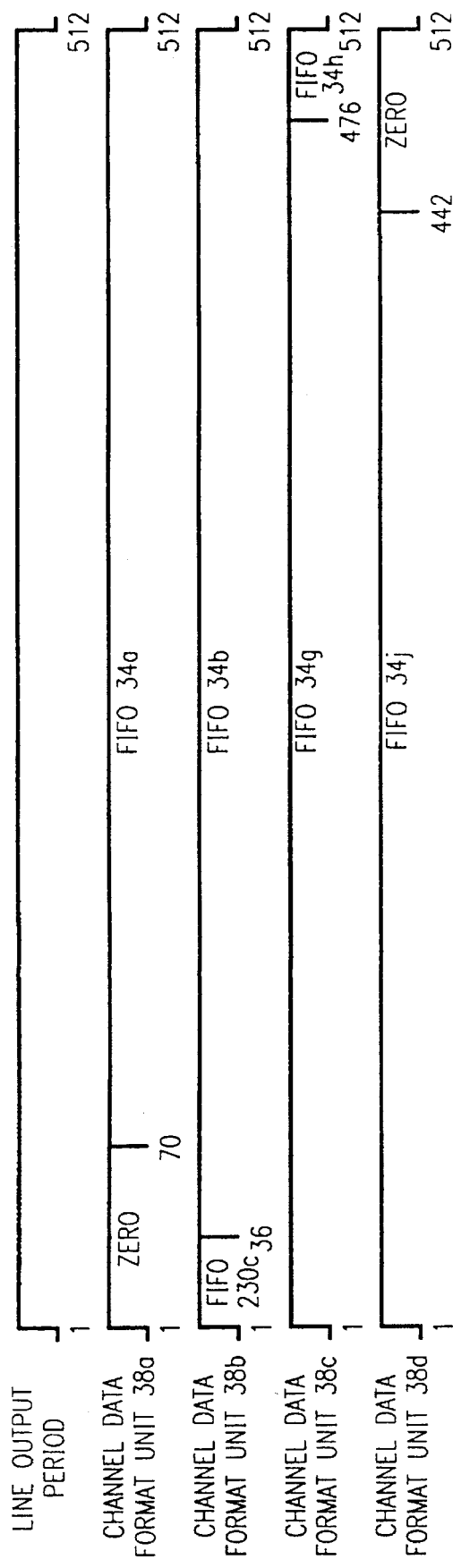

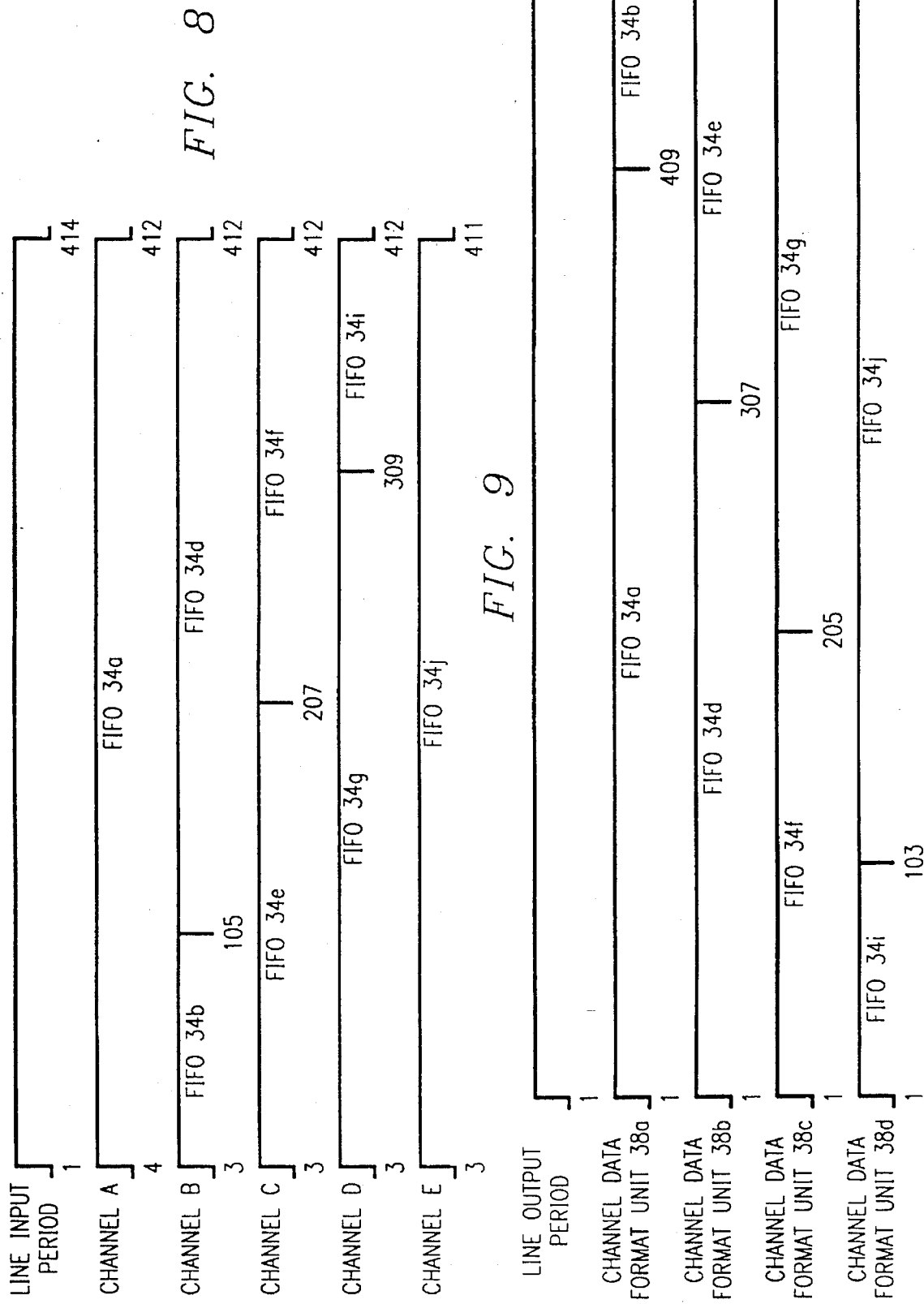

5,488,431

VIDEO DATA FORMATTER FOR A MULTI-CHANNEL DIGITAL TELEVISION SYSTEM WITHOUT OVERLAP

This application is a continuation of application Ser. No. 08/148,768 filed Nov. 4, 1993, which is now abandoned.

CROSS REFERENCE TO RELATED PATENTS AND APPLICATIONS

The following patents and applications are related to the present application, and are incorporated by reference herein:

U.S. Pat. No. 4,615,595, entitled, "FRAME ADDRESSED SPATIAL LIGHT MODULATOR";

U.S. Pat. No. 5,079,544, entitled, "STANDARD INDEPENDENT DIGITIZED VIDEO SYSTEM";

U.S. Pat. No. 4,939,575, entitled, "FAULT-TOLERANT SERIAL VIDEO PROCESSOR DEVICE";

U.S. Ser. No. 07/678,761, "DMD ARCHITECTURE AND TIMING FOR USE IN A PULSE-WIDTH MODULATED DISPLAY SYSTEM";

U.S. Ser. No. 08/147,249, "DIGITAL TELEVISION SYSTEM"; and

U.S. Ser. No. 08/147,801, "SYSTEM AND METHOD FOR PACKING DATA INTO VIDEO PROCESSOR".

TECHNICAL FIELD OF THE INVENTION

This invention relates in general to the field of electronic devices. More particularly, this invention relates to video data formatter for a digital television system.

SUMMARY OF THE INVENTION

In accordance with the present invention, a digital television system is provided. In designing the digital television system according to the teachings of the present invention, a heretofore unrecognized problem was discovered. The digital television system may comprise a plurality of processing channels each containing a predetermined number of pixels. Each channel may overlap by, for example, one to five pixels with an adjacent channel for processing purposes. Additionally, the display of the digital television system may have a number of channels having a different pixel width from the processing channels such that the channels of the display are incompatible with the processing channels. The teachings of the present invention relate to a system and method for formatting video data for a digital display of a digital television system.

More specifically, the present invention provides a video data formatter for use in a digital television system having a plurality of processing channels and a display having a second plurality of channels. The video data formatter comprises a line segment mapper and a data format unit. The line segment mapper receives processed video data from the processing channels of the digital television system. The line segment mapper is operable to remove pixels from adjacent processing channels that are common to both channels and is operable to divide each channel into two or more segments. The data format unit receives the stored line segments from the line segment mapper. The data format unit is operable to couple the segments to create a plurality of appropriate channels for the display.

It is a technical advantage of the present invention to provide a video data formatter for a digital television system that removes overlap between adjacent channels before a processed video signal is displayed. The digital television system processes a video signal in a plurality of parallel channels. The channels of the system may correspond to vertical strips of a video frame. Each channel may contain an overlap of, for example, one to five pixels with an adjacent channel. The overlap between channels may allow horizontal processing of pixels on the end of a channel. The overlapping pixels may be removed before the processed video signal is displayed such that redundant pixels are not displayed.

It is another technical advantage of the present invention to reformat the processed video data for a display. The display may have a plurality of associated channels that differ in pixel width from the processing channels. The processing channels may be altered to match the pixel width through the channels of the display.

It is another technical advantage of the present invention to provide one bit plane of data for each bit of video data associated with a pixel to a display of a digital television system. The display may provide $2^X$ intensity levels for each video signal in response to the bit planes formed from the video data wherein X is the number of bits for each pixel. The first bit plane, corresponding to the most significant bit for each pixel, may control the display for one-half of the time for one frame. Successive bit planes may each control the display for a period of time proportionate to the position of the bits of that bit plane in the pixels making up that bit plane.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein:

FIG. 6 is a timing diagram that illustrates how data is stored in the formatter of FIG. 5 for a system comprising four processing channels;

FIG. 7 is a timing diagram that illustrates how data stored according to the timing diagram of FIG. 6 is formatted for channels of a display of FIG. 1;

FIG. 8 is a timing diagram that illustrates how data is stored in the formatter of FIG. 5 for a system comprising five processing channels;

FIG. 9 is a timing diagram that illustrates how data stored according to the timing diagram of FIG. 8 is formatted for channels of a display of FIG. 1;

DETAILED DESCRIPTION OF THE INVENTION

Figure 1:
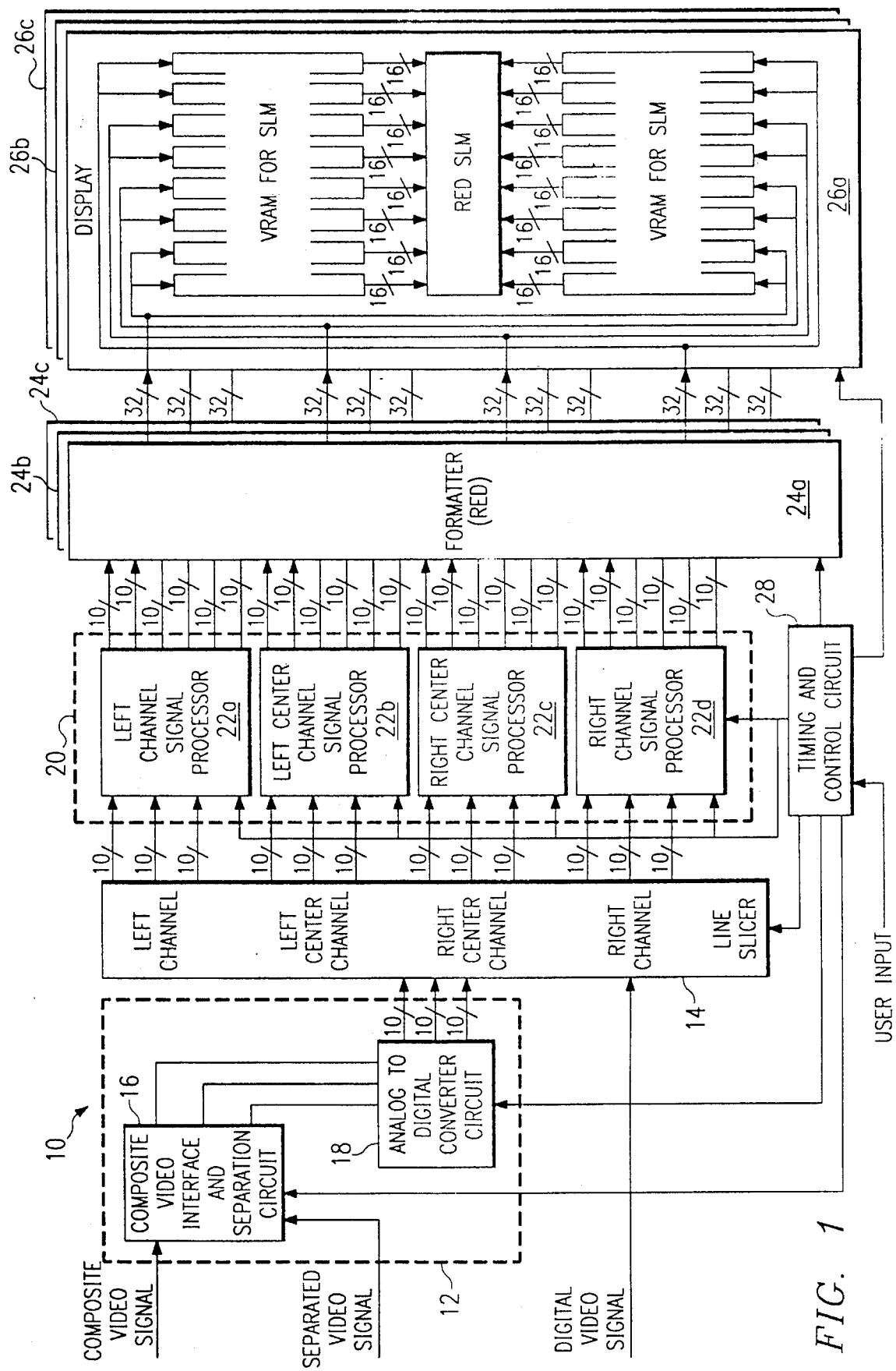
FIG. 1 illustrates a digital television system constructing according to the teachings of the present invention.

FIG. 1 illustrates a digital television system indicated generally at 10 and constructed according to the teachings of the present invention. System 10 comprises a parallel architecture wherein input video signals may be divided into channels to be processed in parallel. For example, system 10 may implement appropriate functions such that a standard video signal may be used to provide a high definition video display. Alternatively, system 10 may sample and display a high definition video signal.

System 10 may receive video signals in composite or component form. For example, system 10 may receive an analog composite video signal, an analog video signal in component form, or a digital video signal. System 10 may convert a composite video signal into a plurality of video signals for processing. For example, an analog composite video signal in the format established by the National Television Standards Committee (hereinafter "NTSC") may be separated into a luminance signal, identified by the symbol Y, and two color difference signals, identified by the symbols I and Q. Alternatively, system 10 may separate other standard composite video signals into appropriate video signals for processing according to Table 1 below.

TABLE 1

| Input Video Format | Color Space Domain |
|---|---|
| NTSC | Y, I, Q |
| PAL and SECAM | Y, U, V |
| SMPTE 240M, SMPTE 260M | Y, Pr, Pb |

It is noted that the other standard video formats include: Phase Alternating Line, hereinafter "PAL"; Sequential Color with Memory, hereinafter "SECAM"; and Society of Motion Picture Engineers, hereinafter "SMPTE".

Each of these standard video signals comprise a luminance signal, hereinafter "luma" or "Y" and a chrominance signal, hereinafter "chroma" or "C". The chroma signal may be further divided into appropriate color difference signals as shown in Table 1. For clarity, each of the standard video signals may hereinafter be referred to as providing a video signal in a "color difference color space" or a "Y-I-Q color space." As an alternative to the standard video signals of Table 1, a video source may be coupled to system 10 to provide a red video signal, hereinafter "R" a green video signal, hereinafter "G" and a blue video signal, hereinafter "B". Such a video source may hereinafter be refereed to as providing a video signal in an "R-G-B color space."

System 10 prepares a video signal for parallel processing in receiving circuitry 12, and line slicer 14. Receiving circuitry 12 may receive, for example, a composite video signal in the NTSC format from an external source (not explicitly shown). Alternatively, receiving circuitry 12 may receive separate Y and C video signals. Furthermore, receiving circuitry 12 may receive separate video signals in an R-G-B color space. The format of the video signal is indicated to receiving circuitry 12 by a mode select-input.

Receiving circuitry 12 comprises composite video interface and separation circuit 16 coupled to analog to digital converter circuit 18. Composite video interface and separation circuit 16 may separate a composite video signal into, for example, three separate video signals. Analog to digital converter circuit 18 may convert each of the separate video signals into ten bit digital video signals. Analog to digital converter circuit 18 of receiving circuitry 12 is coupled to provide three ten bit digital video signals to line slicer 14. Additionally, a digital video signal may be coupled directly to line slicer 14.

Line slicer 14 divides each digital video signal into a plurality of separate channels for each line of composite video signal. For example, line slicer 14 may divide each digital video signal into four, five or another appropriate number of channels. The number of channels may depend on the number of pixels in a line of video signal, and the number of pixels that may be simultaneously processed by a video signal processor of system 10. Line slicer 14 may provide appropriate overlap between the various channels for processing as described below.

System 10 processes the digital video signals in processing circuitry 20. Processing circuitry 20 is coupled to line slicer 14. Processing circuitry 20 comprises a plurality of channel signal processors 22a through 22d. The number of channel signal processors 22 may be equal to the number of channels provided by line slicer 14. Each channel signal processor 22a through 22d receives all three 10 bit digital video signals for the channel corresponding to that signal processor 22a through 22d. Processing circuitry 20 may convert each line of digital video signal into two lines of digital video signal output. Each channel signal processors 22a through 22d, therefore, may have six separate outputs, for example, two ten bit red outputs, two ten bit green outputs, and two ten bit blue outputs. Additionally, processing circuitry 20 may perform the following functions: color space conversion, gamma correction, and picture quality control which will be described in detail below.

System 10 reconnects and displays the processed video data. A plurality of formatters 24a through 24c reconnect the video data and a plurality of displays 26a through 26c display the video data. One formatter 24a through 24c and one display 26a through 26c operate on a different digital video signal as indicated in FIG. 1. For example, formatter 24a and display 26a may operate on a red video signal. Formatter 28b and display 26b may operate on a green video signal. Finally, formatter 24c and display 26c may operate on a blue video signal.

Two ten bit outputs of each channel signal processor 22a through 22d are coupled to an appropriate formatter 24a through 24c. Formatters 24a through 24c remove overlap between adjacent channels, reconnect the channels, and prepare the reconnected digital video signals for display on displays 26a through 26c. Formatters 24a through 24c each provide 128 bit words in four 32 bit channels to displays 26a through 26c. Displays 26a through 26c may comprise, for example, a Spatial Light Modulator (hereinafter "SLM") such as a 2×128 pin Digital Micromirror Device (hereinafter "DMD") produced by TEXAS INSTRUMENTS INCORPORATED. However, displays 26a through 26c are not limited to digital displays. It is within the scope of the teachings of the present invention for the processed video signal to be displayed on an analog display.

Timing and control circuit 28 is coupled to composite video interface and separation circuit 16, analog to digital converter circuit 18, line slicer 14, processing circuitry 20, formatters 24a through 24c, and displays 26a through 26c.

Timing and control circuit 28 is operable to control the timing of each aspect of system 10. The timing of system 10 may be accomplished through use of a synchronization (hereinafter "sync") signal supplied to timing and control circuit 28 by composite video interface and separation circuit 16. Additionally, timing and control circuit 28 is operable to accept user inputs to control the timing of various functions of system 10.

In operation, system 10 may prepare a standard video signal to produce a high definition display. As described previously, system 10 may receive analog or digital video signals in composite or separated form. For conciseness, the operation of system 10 is described in conjunction with receiving an analog composite video signal. System 10 separates a composite video signal into video signals, divides the video signals into a plurality of channels, and processes the channels in parallel. An advantage of using a parallel architecture in system 10 is that system 10 is able to process the video signals at a low speed while providing a high definition display. Consequently, system 10 may incorporate existing video processor components.

Composite video interface and separation circuit 16 separates the composite video signal into, for example, three separate video signals. Composite video interface and separation circuit 16 may, for example, separate a composite video signal into Y, I, and Q video signals of the NTSC standard.

Analog to digital converter circuit 18 may sample each video signal at a frequency of, for example, 71.1 MHz. The appropriate sampling rate may depend on the number of pixels allocated for a line of video on displays 26a through 26c, and the time for one line of video signal to be received by receiving circuitry 12. Therefore, the sampling rate may be adjusted to create a predetermined number of pixels for each line of video signal. Analog to digital converter circuit 18 may comprise, for example, Analog to Digital Converter board AD9060 produced by ANALOG DEVICES. Alternatively, analog to digital converter circuit 18 may comprise another appropriate analog to digital converter device operable to sample data at an appropriate sampling rate on the order of 75 MHz.

Figure 2:
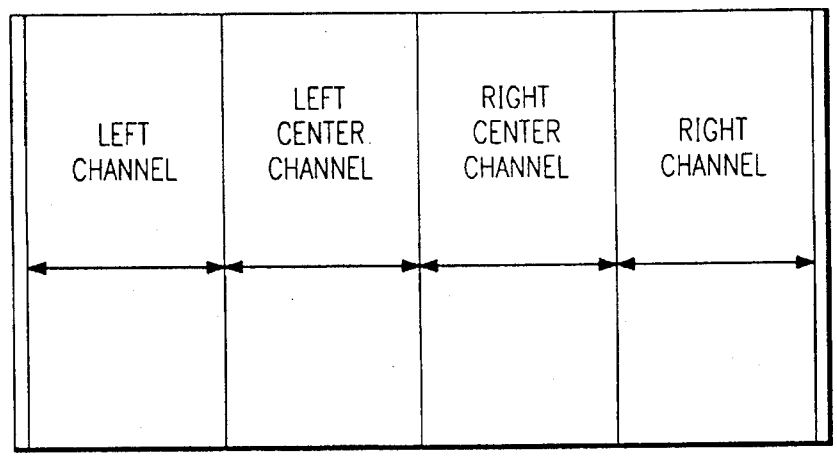
FIG. 2 illustrates four vertical strips created by the system of FIG. 1.

Line slicer 14 divides each digital video signal into a plurality of separate channels for each line of video signal. For example, line slicer 14 may divide each line of the digital video signal into four channels so that the video signal may be processed in parallel. By dividing each line of digital video signal in the same manner, each channel signal processor 22a through 22d effectively processes one vertical strip of each video frame. FIG. 2 shows the four vertical strips processed by channel signal processors 22a through 22d for the embodiment of FIG. 1. Alternatively, line slicer 14 may divide a line on a pixel by pixel basis or line slicer 14 may divide a video frame into horizontal strips. An advantage of dividing a video frame into vertical strips is that the related processing steps performed by processing circuitry 20 are simplified.

Figure 3:
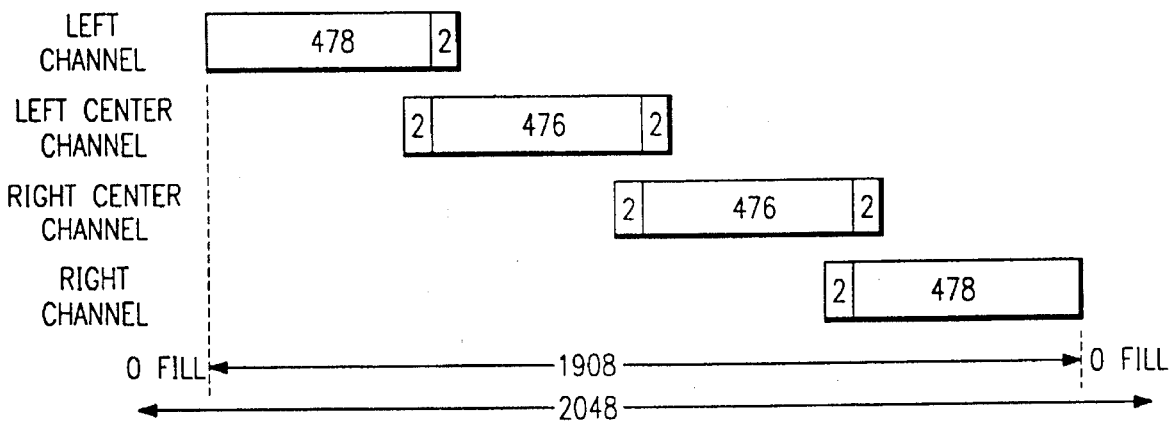
FIG. 3 illustrates the overlap in pixels between adjacent channels created by the system of FIG. 1.

Additionally, line slicer 14 may provide for overlap between the vertical channels by providing common pixels to adjacent channels as shown in FIG. 3. The overlap may comprise, for example, from one to five pixels. The overlapping pixels may be used to provide appropriate data for each channel to perform the various functions described below as called for by processing circuitry 20. The amount of overlap between channels may be varied depending of the specific functions implemented in processing circuitry 20.

System 10 processes the digital video signals in processing circuitry 20. Processing circuitry 20 may perform the progressive scan function (hereinafter "proscan"). Proscan "de-interlaces" a video signal by creating an entire video frame from a single or multiple video fields at the field rate. As described previously, a standard video signal may comprise two fields of video data for each frame. Additionally, processing circuitry 20 may convert the digital video signals into a different color space. For example, processing circuitry 20 may convert digital video signals from a color difference color space to an R-G-B color space. Furthermore, processing circuitry may remove a gamma curve from a standard video signal. Finally, processing circuitry 20 may control the quality of a video display in response to user inputs such as inputs for adjustments to brightness, hue, contrast, sharpness and saturation. Each of these functions is described in detail below.

System 10 reconnects and displays the processed digital video signal using formatters 24a through 24c and displays 26a through 26c. Formatters 24a through 24c remove overlap between adjacent channels. Additionally, formatters 24a through 24c prepare the reconnected digital video signals for display on displays 26a through 26c. For example, formatters 24a through 24c may produce a plurality of bit planes from the reconnected digital video signals. Each bit plane may correspond to a particular bit for each pixel in a particular video frame. In the embodiment of FIG. 1, formatters 24a through 24c each may produce 10 bit planes of video data for each separate video signal that are to be provided to displays 26a through 26c in 128 bit words. Based on the output of formatters 24a through 24c, displays 26a through 26c may project appropriate images corresponding to the processed video signals on, for example, a screen (not shown). The combination of the different video signals output by displays 24a through 24c result in a single, appropriately colored, image.

It should be understood that system 10 may be operable to be programmed to accept any appropriate standard analog or digital video signal. Alternatively, system 10 may be preprogrammed to accept only a limited number of appropriate standard analog or digital video signals.

Figure 4:
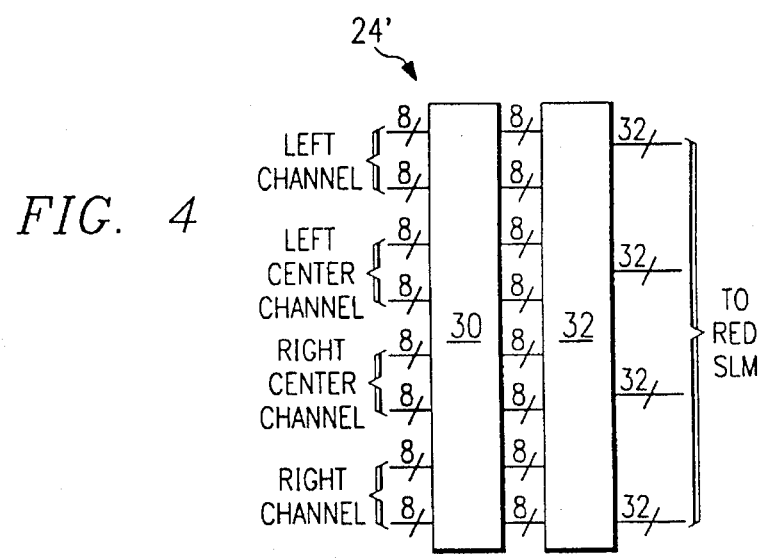
FIG. 4 illustrates an embodiment of a formatter of FIG. 1 constructed to the teachings of the present invention.

FIG. 4 illustrates an embodiment of a formatter indicated generally at 24' and constructed according to the teachings of the present invention. One formatter 24' of the type illustrated in FIG. 29 may be used for each of formatters 24a through 24c of FIG. 1. For conciseness, formatter 2' will be described in terms of formatter 24a of FIG. 1. It is understood that formatter 24' is not so limited, but may be used for formatters 24b and 24c as well.

Formatter 24' comprises line segment mapper 30 and data format unit 32. Line segment mapper 30 is coupled to two output lines from each channel signal processor 22a through 22d of FIG. 1. For example, line segment mapper 30 may be coupled to the two output lines corresponding to the red component video signal from each channel signal processor 22a through 22d. Line segment mapper 30 is coupled to provide a number of outputs equal to the number of inputs to data format unit 32. Data format unit 32 provides four 32 bit output signals to display 26a of FIG. 1.

In operation, line segment mapper 30 receives processed video data for one of the component video signals, such as, for example, the red component. The video signals received from channel signal processors 22a through 22d of FIG. 1 contain some overlap due to the manner in which line slicer 14 divides the input video signals as described previously with respect to FIG. 1. Line segment mapper 30 operates to remove the overlap in the various channels caused by line slicer 14. Once the overlap has been removed, the video signal is formatted, for example, for display 26a of FIG. 1 by data format unit 32. For example, data format unit 32 may create a series of bit planes wherein one bit of data in each bit plane corresponds to each pixel of display 26a. Data format unit 32 may provide these bit planes to display 26a in 128 bit words as described below.

Figure 5:
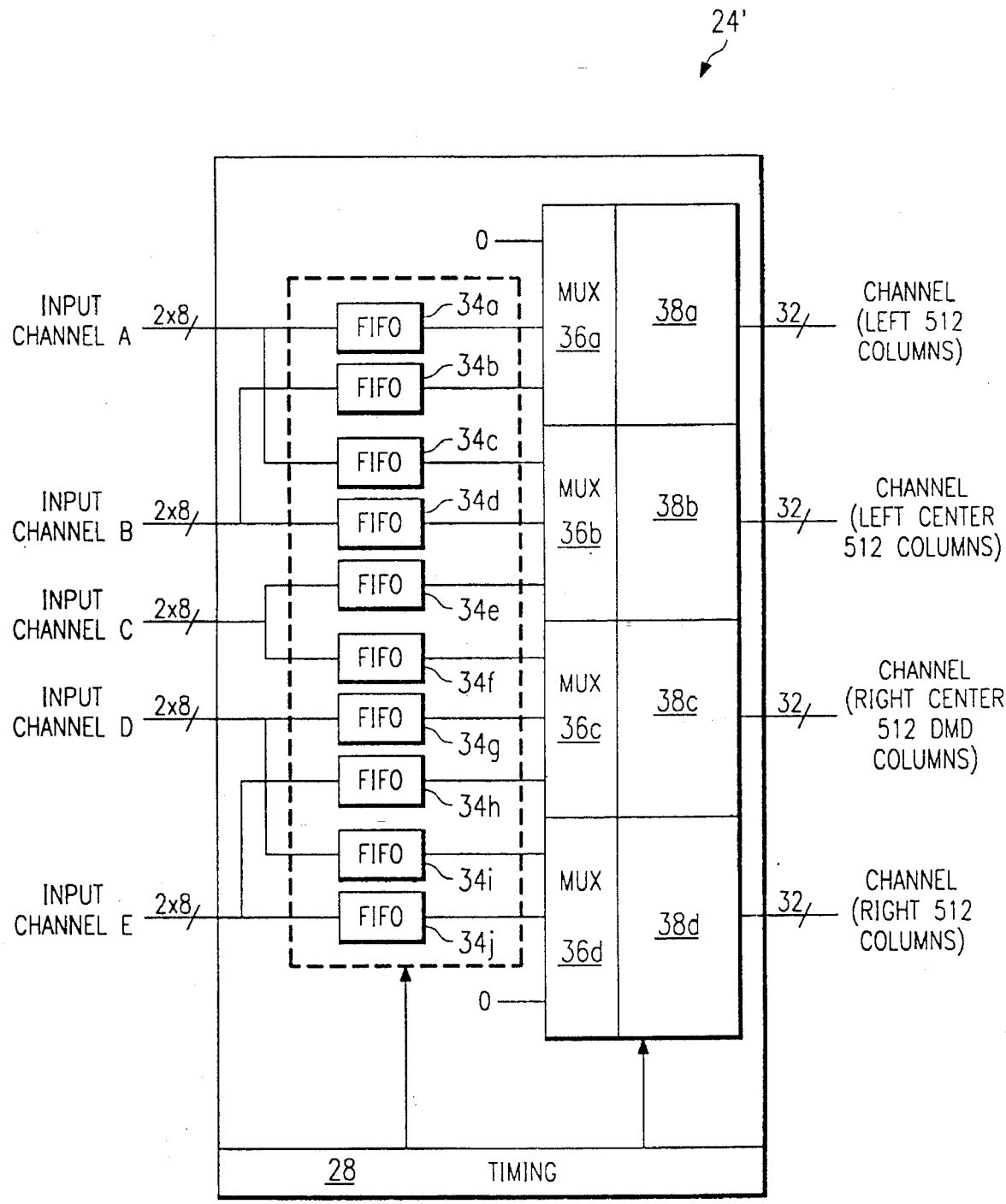
FIG. 5 illustrates a formatter constructed according to the teachings of the present invention.

FIG. 5 illustrates a formatter indicated generally at 24' and constructed according to the teachings of the present invention. System 10 may comprise one formatter 24' for each formatter 24a through 24c. For conciseness, formatter 24' will only be described with respect to formatter 24a. It is understood that the description of formatter 24' is equally applicable to formatters 24b and 24c.

As described previously with respect to FIG. 1, line slicer 14 may provide, for example, two or three pixels of overlap between adjacent channels for processing circuitry 20. Formatter 24' may be used to remove this overlap such that a line of video displayed on displays 26a through 26c does not display redundant pixels. Additionally, displays 26a through 26c may be divided into a plurality of channels. The pixel width of the channels of displays 26a through 26c may be different from the pixel width of the channels of processing circuitry 20. Formatter 24' may reorganize the channels of processing circuitry 20 of FIG. 1 to provide an appropriate plurality of channels for displays 26a through 26c of FIG. 1.

Formatter 24' may comprise, for example, line segment mapper 30' and data format unit 32'. Line segment mapper 30' may comprise, for example, a plurality of first in-first out buffer memories 34a through 34j. Formatter 24' may comprise five separate input channels labelled A through E. Input channels A through E of formatter 24' may be coupled to appropriate channels of processing circuitry 20 of FIG. 1. For example, input channels A, B, D and E may be coupled to channel signal processors 22a through 22d of FIG. 1 respectively. Alternatively, in an embodiment of processing circuitry 20 comprising five channel signal processors, each channel signal processor may be coupled to an appropriate input channel A, B, C, D or E.

Each input channel A through E may be coupled to two first in-first out buffer memories 34a through 34j of line segment mapper 30'. With each channel A through E coupled to two first in-first out buffer memories, line segment mapper 30' may move a plurality of pixels from one end of one input channel to the opposite end of a display channel. In the embodiment of FIG. 5, input channel A is coupled to first in-first out buffer memories 34a and 34c. Input channel B is coupled to first in-first out buffer memories 34b and 34d. Input channel C is coupled to first in-first out buffer memories 34e and 34f. Input channel D is coupled to first in-first out buffer memories 34g and 34i. Input channel E is coupled to first in-first out buffer memories 34h and 34j. Each input channel A through E may be coupled to two lines of output from processing circuitry 20 of FIG. 1.

Data format unit 32' may comprise a plurality of channels each corresponding to an appropriate channel of display 26a of FIG. 1. For example, data format unit 32' may be divided into four separate channels to provide four separate 32 bit outputs to display 26a of FIG. 1. Data format unit 32' may comprise, for example, a plurality of multiplexers 36a through 36d, and a plurality of channel data format units 38a through 38d. Each multiplexer 36a through 36d is associated with an appropriate channel data format unit 38a through 38d. Each multiplexer 36a through 36d comprises three inputs. The inputs of multiplexer 36a are coupled to first in-first out buffer memories 34a and 34b and a constant zero input. Multiplexer 36b is coupled to first in-first out buffer memories 34c through 34e. Multiplexer 36c is coupled to first in-first out buffer memories 34f through 34h. Multiplexer 36d is coupled to first in-first out buffer memories 34i and 34j and a constant zero input. Each multiplexer 36a through 36d is coupled to an appropriate channel data format unit 38a through 38d.

It is noted that the embodiment of formatter 24' illustrated in FIG. 5 may be used in a system having four or five parallel processing channels. However, the teachings of the present invention are not intended to be limited to a system having four or five channels. The teachings of the present invention encompass a system having less than four channels as well as a system having more than five channels.

In operation, formatter 24' stores a line of video data in line segment mapper 30'. FIG. 6 is a timing diagram that illustrates how the data received from the channels of system 10 are stored in first in-first out buffer memories 34a through 34j. The timing provided for by FIG. 6 allows formatter 24' to remove overlap between adjacent channels and to prepare appropriate channels for display 26a. Each time unit of FIG. 6 corresponds to the time for storing one pixel of data in a first in-first out buffer memory 34a through 34j. Beginning at a time 1 in FIG. 6, channels B, D and E each discard the first pixel of video data for their respective channels. The first pixel of each of these channels corresponds to an overlapping pixel as shown in FIG. 3. At time 1, channel A begins storing pixels in first in-first out buffer memories 34a. At time 2, channels B, D and E each discard the second pixel of their respective channels. At time 3, channels B, D and E each begin storing pixels in first in-first out buffer memories 34b, 34g, and 34h respectively. At time 38, channel E switches to storing pixels in first in-first out buffer memory 34j. Channel E is switched to compensate for differences in pixel width between the channels of processing circuitry 20 and the channels of display 26a. This function allows a portion of channel E to be combined with channel D. At time 442, channel A switches to storing pixels in first in-first out buffer memory 34c to compensate for differences in pixel width between the channels of processing the circuitry 20 and the channels of display 26a. At time 478, channels A, B, D and E stop storing pixels. Thereby, pixels 479 and 480 of each channel are discarded to remove overlap between the channels. At time 480, the period for storing data for a particular line of video signal in line segment mapper 30' terminates. It is noted that the timing shown in FIG. 6 may be adjusted to control the number of pixels that are removed from the various channels. For example, channel A may begin storing pixels at time 4 thereby removing pixels, 1, 2 and 3. Additionally, the time at which a channel is switched from one buffer memory to another may be altered to provide appropriate channels for display 26a. Thus, the overlapping pixels are removed from channels A through E and channels A through E are prepared to be combined into appropriate channels for display 26a.

FIG. 7 is a timing diagram that illustrates how data is received from first in-first out buffer memories 34a through 34j to create appropriate channels for display 26a. The pixels stored in first in-first out buffer memories 34a through 34j are communicated to channel data format units 38a through 38d by multiplexers 36a through 36d, respectively.

Multiplexer 36a provides a constant zero input to channel data format unit 38a from time 1 through time 70. Therefore, the first 70 pixels of each line correspond to a black strip on a first side of a displayed video frame. Multiplexer 36a provides the pixels stored in first in-first out buffer memory 34a to channel data format unit 38a from time 71 through 512 thereby completing a channel of display 26a.

Multiplexer 36b provides pixels from channels A and B to channel data format unit 38b. Pixels stored in first in-first out buffer memory 34c from channel A are provided to channel data format unit 38b from time 1 through time 36. Beginning at time 37, pixels stored in first in-first out buffer memory 34b from channel B are provided to channel data format unit 38b. In this manner, pixels from channel A are combined with pixels from channel B to form another channel for display 26a.

Multiplexer 36c combines pixels from channel D with pixels from channel E to form another channel for display 26a. Beginning at time 1, multiplexer 36c provides pixels stored in first in-first out buffer memory 34g to channel data format unit 38c. At time 476, multiplexer 36C switches to provide pixels from first in-first out buffer memory 34h channel to data format unit 36c.

Multiplexer 36d provides pixels from channel E to channel data format unit 38d. From time 1 through time 442, multiplexer 36d provides pixels stored in first in-first out buffer memory 34j to channel data format unit 38d. Beginning at time 443, multiplexer 36d provides a constant zero input to channel data format unit 38d. The last 70 pixels of each line of video thereby correspond to a black strip on a second side of a displayed video frame. Thus, formatter 24' reformats the channels of processing circuitry 20 for use with the channels of display 26a.

FIG. 8 is a timing diagram that illustrates how data from a system 10 comprising 5 channels is stored in first in-first out buffer memories 34a through 34j. The timing provided for by FIG. 8 allows formatter 24' to remove overlap between adjacent channels and to prepare appropriate channels for display 26a. Each time unit of FIG. 8 corresponds to the time for storing one pixel of data in a first in-first out buffer memories 34a through Beginning at time 1 in FIG. 8, channels A through E each discard the first pixel of video data for their respective channels. The first pixel of channel A may be removed because it is an edge pixel that was not fully processed. As for channels B through E, the first pixel corresponds to an overlapping pixel. At time 3, channels B through E begin storing pixels in first in-first out buffer memories 34b, 34e, 34g, and 34j respectively. In this manner, channels B through E remove the second pixel of their respective channels. At time 4, channel A begins storing pixels in first in-first out buffer memory 34a thereby removing pixels 2 and 3 from channel A. At time 105, channel B switches to storing pixels in first in-first out buffer memory 34d. Channel B switches to compensate for differences between the channels of processing circuitry 20 and the channels of display 26a. Similarly, at time 207, channel C switches to store pixels in first in-first out buffer memory 34f. Finally, at time 309, channel D switches to store pixels in first in-first out buffer memory 34i.

At time 411, channel E stops storing pixels thereby removing pixels 412 through 414 from channel E. Similarly, channels A through D stop storing pixels at time 412 thereby removing pixels 413 and 414 from channels A through D respectively. As with FIG. 6, it is noted that the timing shown in FIG. 8 may be adjusted to control the number of pixels that are removed from the various channels. Additionally, the time at which a channel is switched from one buffer memory to another may be altered to provide appropriate channels for display 26a. Thus, the overlapping pixels are removed from channels A through E and channels A through E are prepared to be combined in appropriate channels for display 26a.

FIG. 9 is a timing diagram for retrieving data from first in-first out buffer memories 34a through 34j to create appropriate channels for display 26a. Multiplexer 36a combines pixels from channel A and channel B to produce a single channel for display 26a. Multiplexer 36a provides the pixels stored in first in-first out buffer memory 34a to channel data format unit 38a from time 1 through time 409. Multiplexer 36a also provides the pixels stored in first in-first out buffer memory 34b to channel data format unit 38a from time 410 through time 512.

Multiplexer 36b combines pixels from channels B and C to form a single channel for display 26a. Multiplexer 36b provides pixels stored in first in-first out buffer memory 34d to channel data format unit 38b from time 1 through time 307. Multiplexer 36b provides pixels from first in-first out buffer memory 34e to channel data format unit 38b from time 308 through time 512.

Multiplexer 36c combines pixels from channels C and D to form a single channel for display 26a. Multiplexer 36c provides pixels stored in first in-first out buffer memory 34d to channel data format unit 38b from time 1 through time 307. Multiplexer 36c provides pixels from first in-first out buffer memory 34f to channel data format unit 38c from time 1 through time 205. Multiplexer 36c provides the pixels stored in first in-first out buffer memory 34g to channel data format unit 38c from time 206 to time 512.

Multiplexer 36d combines pixels from channels D and E to form a single channel for display 26a. Multiplexer 36d provides pixels stored in first in-first out buffer memory 34i to channel data format unit 38d from time 1 through time 103. Multiplexer 36d provides pixels from first in-first out buffer memory 34j to channel data format unit 38d from time 104 through time 512. Thus, formatter 24' reformats the channels of processing circuitry 20 for use with the channels of display 26a.

Figure 10:
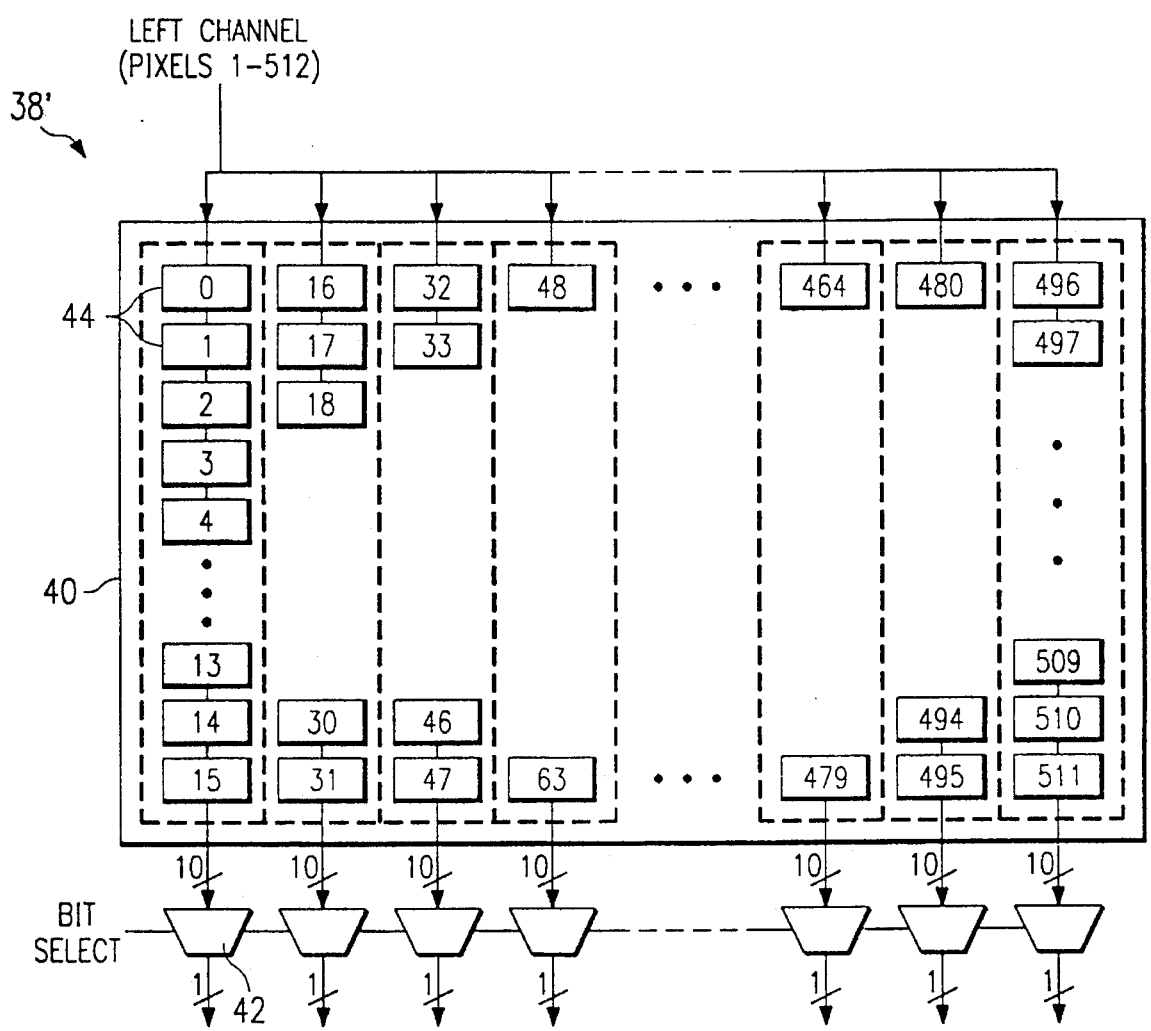
FIG. 10 illustrates an embodiment of a channel data format unit of FIG. 5 constructed according to the teachings of the present invention.

FIG. 10 illustrates an embodiment of a channel data format unit indicated generally at 38' and constructed according to the teachings of the present invention. Data format units 38a through 38d may comprise a data format unit 38' of FIG. 10. For conciseness, however, channel data format unit 38' will be described in terms of the location of data format unit 38a of FIG. 5. Additionally, channel data format unit 38' will be described in terms of display 26a of FIG. 1. It should be understood that channel data format unit 38' is not so limited, but may be used as channel data format unit 38b through 38d and may be used with display 26b or 26d.

Data format unit 38' comprises buffer memory 40 and a plurality of multiplexers 42. Plurality of multiplexers 42 may comprise, for example, 32 multiplexers controlled by a bit select signal from timing and control circuit 28 of FIG. 1. Buffer memory 40 is coupled to multiplexer 36 as shown in FIG. 5.

Buffer memory 40 comprises a plurality of memory locations 44 equal in number to the number of pixels in one channel of display 26a. Memory locations 44 may, for example, be oriented in 16 rows, each comprising 32 columns. Each multiplexer 42 may be coupled to an output of buffer memory 40 corresponding to a column of memory locations 44.

In operation, one channel, for example, a channel of display 26a associated with channel data format unit 38a, of an individual line of video signal may be sequentially received and stored in memory locations 44 of buffer memory 40. Each memory location 44 comprises 10 bits of video data for one pixel in a single channel of a line of a video frame. The video data may be communicated to a channel of display 26a of FIG. 1, for example, one line at a time to form 10 bit planes. A bit plane corresponds to one bit of data for each pixel in a video frame. Therefore, the first bit plane, for example, may correspond to the most significant bit for each pixel and the tenth bit plane may correspond to the least significant bit for each pixel.

Once the data for a channel of a first line of a video frame is stored in buffer memory 40, channel data format unit 38' may create the first line of the appropriate bit planes for one channel of display 26a. Channel data format unit 38' may communicate the first line of the ten bit planes for the one channel of display 26a in 32 bit words to display 26a of FIG. 1. For example, the first 32 bit word used in forming a channel of the first line of the first bit plane may correspond the bottom row of memory locations 44 of buffer memory 40. The first bit of each memory location 44 in successive rows of buffer memory 40 may be used to create successive 32 bit words to fill out the first line of the first bit plane for the channel of display 26a. The first line of a first bit plane for the channel is complete once all of the first bits stored in all of the rows of memory locations 44 have been used. This process may be repeated for successive bits in each memory location 44 until all of the data for a channel of a single line of video signal has been communicated to display 26a of FIG. 1. Thereby, the first line of each of the 10 bit planes of data for a channel of a single frame of video signal are communicated to display 26a of FIG. 1. The remaining lines of each of the ten bit planes associated with a frame of video may be communicated to display 26a of FIG. 1 by repeating the above process for each line in the video frame.

Figure 11:
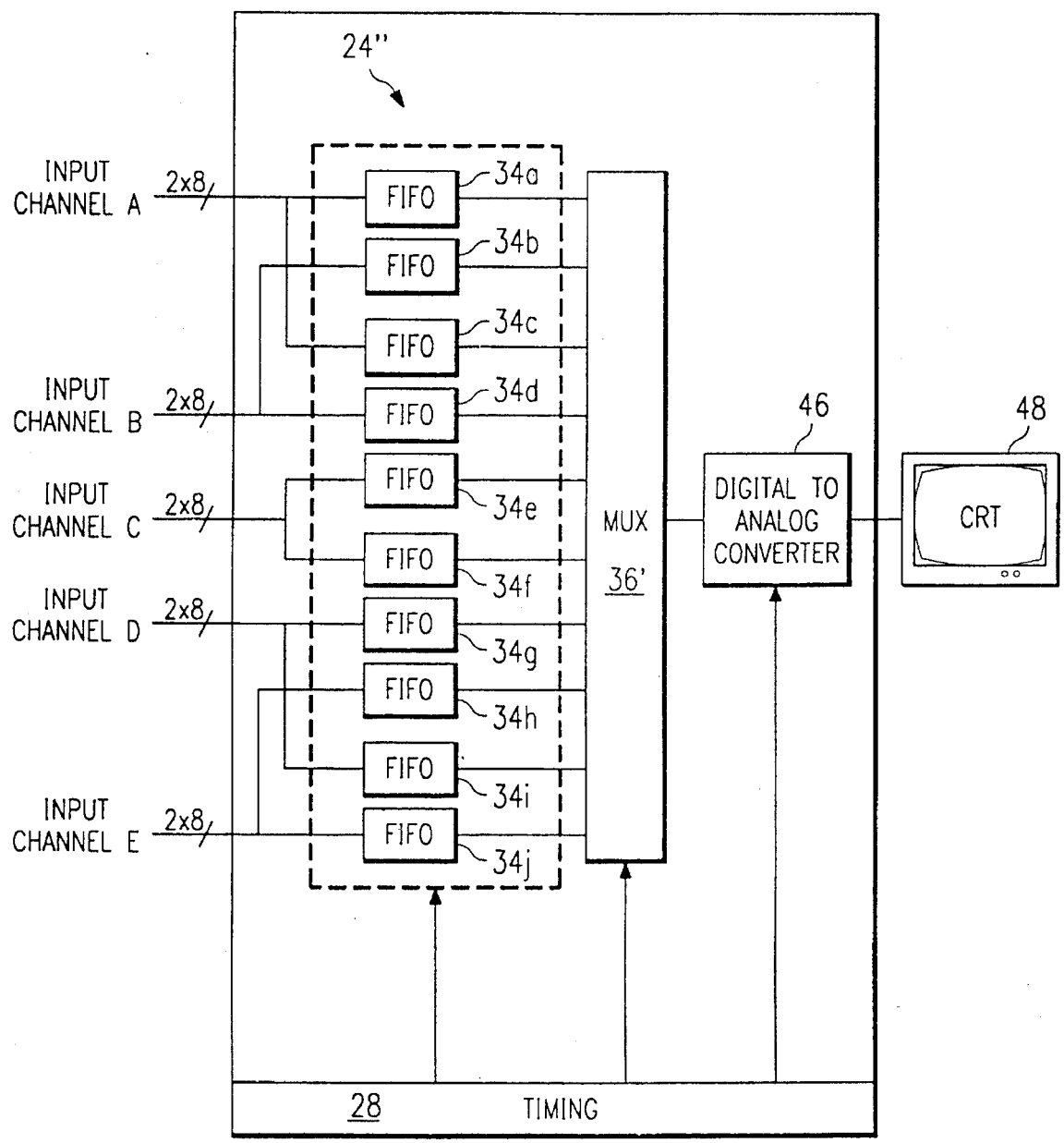
FIG. 11 illustrates another embodiment of a formatter constructed according to the teachings of the present invention.

FIG. 11 illustrates an alternative embodiment of a formatter indicated generally at 24". Formatter 24" comprises a single multiplexer 36' in place of multiplexers 36a through 36d of FIG. 5. Multiplexer 36' may comprise a single output line coupled to digital to analog converter 46. Digital to analog converter 46 may be coupled to an appropriate analog display such as a cathode ray tube (CRT) device.

In operation, first in-first out buffer memories 34a through 34j may store video data as described above with respect to FIGS. 5, 6, and 8. Video data may be read out of first in-first out buffer memories 34a through 34j by multiplexer 36' so as to provide a single stream of video data for CRT 40. The output of multiplexer 36' may be converted to an appropriate analog signal for CRT 40 by digital to analog converter 46. The timing of digital to analog converter 46 and multiplexer 36' is controlled by timing and control circuit 28.

Figure 12:
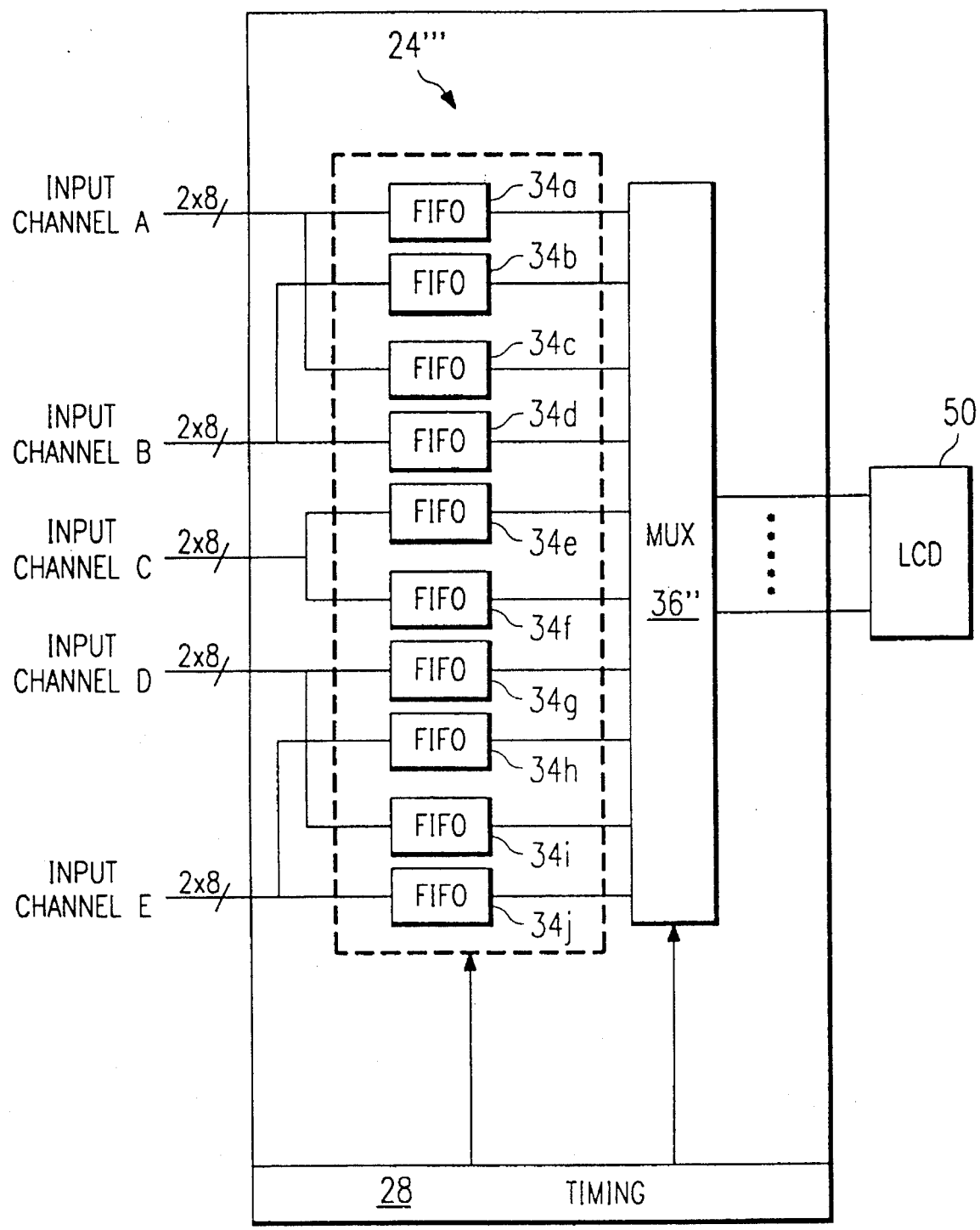
FIG. 12 illustrates another embodiment of a formatter constructed according to the teachings of the present invention.

FIG. 12 illustrates an alternative embodiment of a formatter indicated generally at 24'". Formatter 24'" comprises a single multiplexer 36" in place of multiplexers 36a through 36d of FIG. 5. Multiplexer 36" may comprise an appropriate number of output lines coupled to liquid crystal display (LCD) 50.

In operation, first in-first out buffer memories 34a through 34j may store video data as described above with respect to FIGS. 5, 6, and 8. Video data may be read out of first in-first out buffer memories 34a through 34j by multiplexer 36' so as to provide an appropriate stream of video data for LCD 50. The timing of multiplexer 36" is controlled by timing and control circuit 28.

Although the present invention has been described in detail, it should be understood that various changes, substitutions and alterations may be made hereto without departing from the spirit and scope of the invention as defined by the appended claims. For example, the number of channels provided in processing circuitry 20 may be varied without departing from the spirit and scope of the present invention. Furthermore, the extent of overlap between adjacent channels may be varied without departing from the spirit and scope of the invention. Additionally, the formatter of the present invention may be used to format video data for various types of displays.

What is claimed is:

1. A video data formatter for a video system having a plurality of processing channels, comprising:
    a line segment mapper responsive to the plurality of processing channels and operable to remove pixels from adjacent processing channels that are common to both channels, such that data for said common pixels is not repeated when said data is displayed, said line segment mapper further operable to divide each of said processing channels into two or more segments; and
    a data format unit responsive to said line segment mapper and operable to coupled said segment so as to create at least one stream of video data for display.

2. The video data formatter of claim 1, wherein said line segment mapper comprises a plurality of buffer memories.

3. The video data formatter of claim 1, wherein said line segment mapper comprises a plurality of first in-first out buffer memories.

4. The video data formatter of claim 1, wherein said line segment mapper comprises two buffer memories for each processing channel.

5. The video data formatter of claim 1, wherein said line segment mapper comprises two first in-first out buffer memories for each processing channel.

6. The video data formatter of claim 1, wherein said data format unit comprises:
    a plurality of multiplexers operable to output the segments of the processing channels; and
    a plurality of channel data format units responsive to said multiplexers and operable to store video data such that said stored video data of each channel data format unit corresponds to a channel of the display.

7. The video data formatter of claim 1, wherein said data format unit comprises:
    a multiplexer operable to output the segments of the processing channels; and
    a digital to analog converter responsive to said multiplexer and operable to provide an analog output to an analog display.

8. The video data formatter of claim 1, wherein said data format unit comprises a multiplexer operable to output the segments of the processing channels for a liquid crystal display.

9. The video data formatter of claim 1, wherein said data format unit comprises two additional inputs responsive to a centering signal and operable to center the video data from the processing channels on the display.

10. A video data formatter for use in a digital television system having a plurality of processing channels, comprising:
    a plurality of buffer memories responsive to the processing channels and operable to remove pixels from adjacent processing channels that are common to both channels, such that data for said common pixels is not repeated when said data is displayed, said plurality of buffer memories further operable to divide each channel into two or more segments; and
    a data format unit response to said line segment mapper and operable to couple said segments so as to create at least one stream of data for display.

11. The video data formatter of claim 10, wherein said plurality of buffer memories comprises a plurality of first in-first out buffer memories.

12. The video data formatter of claim 10, wherein said plurality of buffer memories comprises two buffer memories for each processing channel.

13. The video data formatter of claim 10, wherein said plurality of buffer memories comprises two first in-first out buffer memories for each processing channel.

14. The video data formatter of claim 10, wherein said data format unit comprises:

a plurality of multiplexers operable to output the segments of the processing channels; and a plurality of channel data format units responsive to said multiplexers and operable to store video data such that said stored video data of each said channel data format unit corresponds to a channel of the display.

15. The video data formatter of claim 10, wherein said data format unit comprises:

a multiplexer operable to output the segments of the processing channels; and a digital to analog converter responsive to said multiplexer and operable to provide an analog output to an analog display.

16. The video data formatter of claim 10, wherein said data format unit comprises a multiplexer operable to output the segments of the processing channels for a liquid crystal display.

17. The video data formatter of claim 10, wherein said data format unit comprises two additional inputs responsive to a centering signal and operable to center the video data from the processing channels on the display.

18. A method for formatting video data, comprising the step of:

processing video data in a plurality of parallel channels, each channel having a predetermined width in pixels and having a predetermined pixel overlap with an adjacent channels;

storing the processed video data in a first plurality of buffer memories such that the overlapping pixels are removed, such that data for said overlapping pixels is not repeated when said data is displayed; and multiplexing the stored video data into a second plurality of buffer memories to reformat the plurality of buffered memories to reformat the plurality of channels to provide at least one steam of output video data to a display.

19. The method of claim 18, wherein the step of storing the processed video data further comprises the step of storing the processed data in a plurality of first in-first out buffer memories.

20. The method of claim 18, wherein the step of storing the processed video data further comprises the step of storing the processed data in a plurality of first in-first out buffer memories having two buffer memories associated with each processing channel such that each processing channel may be separated into two parts.

21. The method of claim 18, wherein the step of multiplexing the stored video data further comprises the step of combining portions of adjacent channels to produce a plurality of channels of a digital display.

* * * * *